United States Patent [19]
Pioch et al.

[11] Patent Number: 5,470,289
[45] Date of Patent: Nov. 28, 1995

[54] METHOD FOR SMOOTHING OUT ACCELERATION JERKS OF A VEHICLE PROPELLED BY AN INTERNAL-COMBUSTION ENGINE

[75] Inventors: Olivier Pioch, Saint-Cere; Dominique Martineau, Plaisance-du-Touch; Henri Dupont, Toulouse, all of France

[73] Assignee: Siemens Automotive S.A., Toulouse-Cedex, France

[21] Appl. No.: 193,079

[22] PCT Filed: Aug. 6, 1992

[86] PCT No.: PCT/EP92/01788

§ 371 Date: Feb. 7, 1994

§ 102(e) Date: Feb. 7, 1994

[87] PCT Pub. No.: WO93/03276

PCT Pub. Date: Feb. 18, 1993

[30] Foreign Application Priority Data

Aug. 6, 1991 [FR] France ........................... 91/10002

[51] Int. Cl.[6] ........................... F02P 5/14; F02P 5/152
[52] U.S. Cl. ........................... 477/111; 123/415; 123/422; 364/431.08
[58] Field of Search ........................... 477/111; 123/415, 123/422, 423; 364/431.08

[56] References Cited

U.S. PATENT DOCUMENTS

| | | |
|---|---|---|
| 4,020,455 | 4/1977 | Irimajiri et al. ................ 123/423 X |
| 4,220,125 | 9/1980 | Nishida et al. . |
| 4,232,642 | 11/1980 | Yamaguchi et al. . |
| 4,346,625 | 8/1982 | Latsch et al. ................ 477/111 X |
| 4,596,217 | 6/1986 | Bonitz et al. ................ 123/422 X |
| 4,713,763 | 12/1987 | Hofmann ................ 477/111 X |
| 4,732,125 | 3/1988 | Takizawa . |
| 4,799,469 | 1/1989 | Nagano et al. . |
| 5,000,148 | 3/1991 | Horiber et al. . |
| 5,070,841 | 12/1991 | Fujimoto et al. ................ 123/422 |
| 5,094,209 | 3/1992 | Kishida et al. ................ 123/422 |
| 5,331,934 | 7/1994 | Asama et al. ................ 123/422 X |

FOREIGN PATENT DOCUMENTS

| | | |
|---|---|---|
| 0339602 | 11/1989 | European Pat. Off. . |
| 62-003173 | 1/1987 | Japan ................ 123/422 |
| 2199892 | 7/1988 | United Kingdom ................ 123/423 |
| 91/13249 | 9/1991 | WIPO . |
| 93/01410 | 1/1993 | WIPO . |

Primary Examiner—Charles A. Marmor
Assistant Examiner—Nathan O. Jensen
Attorney, Agent, or Firm—Herbert L. Lerner; Laurence A. Greenberg

[57] ABSTRACT

An entry into an acceleration phase of the vehicle is detected, the ignition advance of the engine is then reduced to a predetermined value $(a_L)$ and the advance is maintained at this value for a predetermined time interval $(\Delta t)$ which is a function of the selected gear ratio $(r)$ of a gearbox placed on the output side of the engine.

Application to a vehicle propelled by an internal-combustion engine associated with an ignition- and injection-control computer.

10 Claims, 3 Drawing Sheets

METHOD FOR SMOOTHING OUT ACCELERATION JERKS OF A VEHICLE PROPELLED BY AN INTERNAL-COMBUSTION ENGINE

The present invention relates to a method for smoothing out acceleration jerks of a motor vehicle propelled by an internal-combustion engine and, more particularly, to such a method enabling such jerks to be smoothed out in an acceleration phase from a steady state or after a deceleration phase.

Figure 5A:
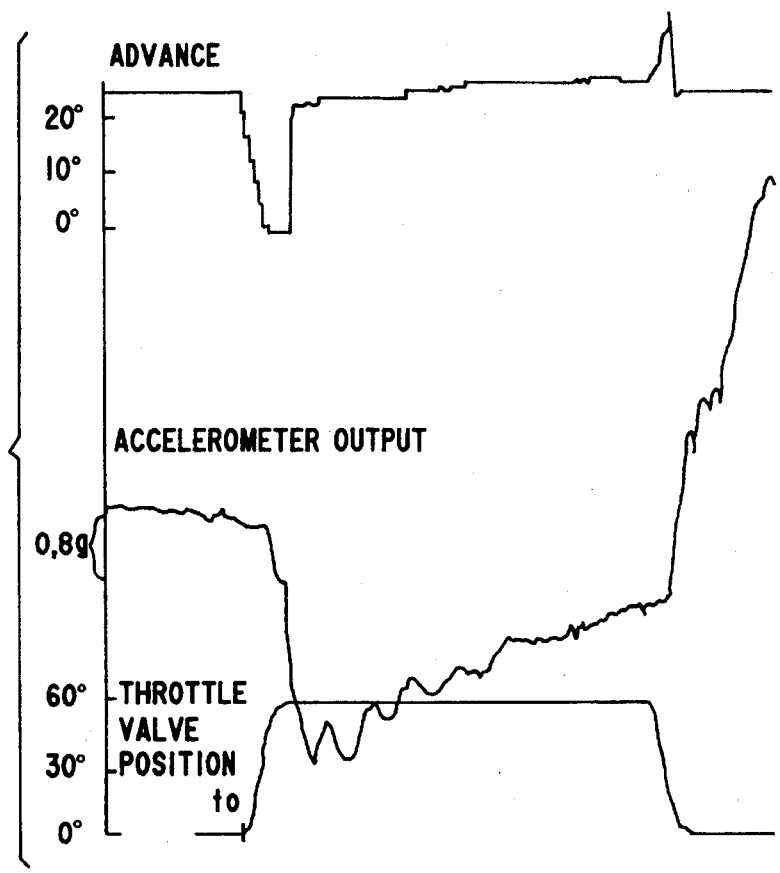
Figure 5B:
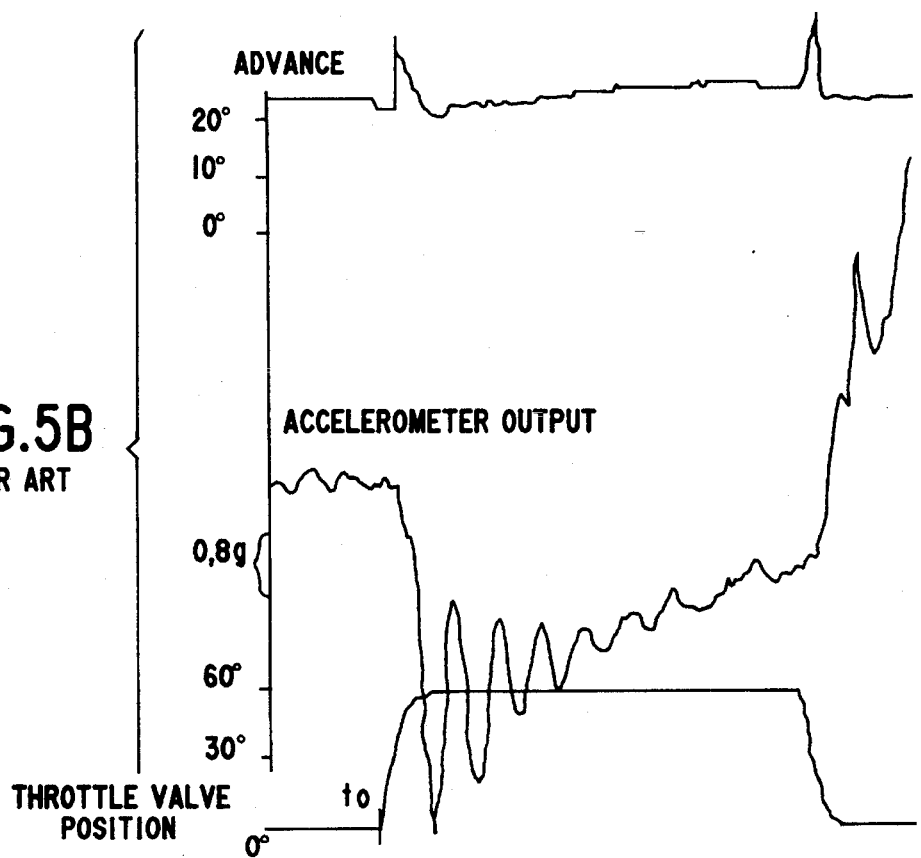

FIG. 5B of the attached drawing shows the variation with time of various parameters connected with the engine or with the vehicle, following an abrupt acceleration requested by the driver at the instant $t_0$. At this instant, the driver presses the accelerator pedal down which controls the opening of the throttle valve. Since the ignition-advance angle A of the engine is conventionally corrected in order to provide a maximum torque, the longitudinal acceleration of the vehicle is recorded with the aid of an accelerometer. On the recording of the output signal from this accelerometer, time oscillations of a substantial amplitude which are progressively damped are observed. These oscillations represent jerks which are disagreeably experienced by the driver. Thus it may be said that the level of driving comfort of the vehicle is lowered by these jerks.

The recorded oscillations of the acceleration arise from the "elasticity" of the kinematic system which goes from the engine to the wheels of the vehicle, in particular at the clutch disc and at the cardan joints. Too rapid an increase in the engine torque, requested by the driver during an acceleration, causes the system to oscillate, the oscillations produced being manifested for the driver by disagreeable jerks in the progression of the vehicle.

Ways have been sought to eliminate these jerks by controlling the engine torque at the start of acceleration. According to a first solution explained in French Patent Application No. 88 09056 filed in the name of BENDIX ELECTRONICS, the action of the accelerator pedal is neutralised over the angle of opening of the throttle valve in an initial zone of the travel of this pedal and the flow rate of air inducted into the engine is then regulated with the aid of a particular control law, in order to avoid jerks, but only in the case of low charges.

According to another solution described in French Patent Application No. 90 02633 in the name of SIEMENS AUTOMOTIVE S.A., the masses of air and of fuel entering the engine are controlled so as to constrain the latter to follow a behaviour defined by a model. It is then possible to optimise the response of the engine, including when transient accelerations are requested by the driver.

These solutions, which require the use of a throttle valve actuated by a motor, thus have the drawback of being expensive.

This drawback is overcome by the method for transient-state correction of the ignition advance of an internal-combustion engine described in French Patent Application No. 91 08585 filed on 9th Jul. 1991 by the Applicant. According to this method, on changing the gear ratio of a gearbox associated with the engine, jerks in the speed of this engine on reaccelerating are eliminated by correcting the ignition advance as a function of the time derivative of the induction pressure of the engine, substantially until leaving the transient state due to the gear-ratio change. The reacceleration is detected by the increase in the pressure at the induction manifold of the engine which results therefrom.

Although this method has given satisfactory results, there is still a need for a method for smoothing out the jerks which is based on a solid theoretical basis, enabling the method to be optimised.

The object of the present invention is therefore to provide a method for smoothing out acceleration jerks which is inexpensive to implement and may be applied to various situations in which an acceleration requested by the driver is liable to cause the jerks which lower the level of driving comfort of the vehicle.

The object of the present invention is also to provide such a method which is sustained by a theoretical basis allowing the process to be optimised.

These objectives of the invention are achieved, as well as others which will emerge on reading the description which follows, with a method for smoothing out acceleration jerks of a motor vehicle propelled by an internal-combustion engine, a method according to which an entry into an acceleration phase of the vehicle is detected, the ignition advance of the engine is then reduced to a predetermined value and the advance is maintained at this value for a predetermined time interval t which is a function of the selected gear ratio of a gearbox placed on the output side of the engine.

As will be seen below, by adopting such a method for controlling the ignition advance during a transient acceleration phase, the amplitude of the jerks mentioned hereinabove is considerably reduced, it being possible to reduce this amplitude to 20% of the amplitude observed without the application of the present invention. As a result there is a great improvement in the driving comfort.

According to a preferred implementation of the method according to the invention, the time interval $\Delta t$ is of the form:

$$\Delta t = \frac{\pi - \phi}{\omega_0} - t_1$$

where:

$$\phi = \arccos\left(\frac{\sin \omega_0 t_1}{2(1 - \cos \omega_0 t_1)}\right),$$

$$\omega_0 = \sqrt{\frac{A}{Br^2 + C}}, \text{ characteristic frequency of the system,}$$

A, B, C are constants, $t_1$ = duration of the acceleration requested by the driver.

Still according to the invention, a reduction ratio x in the torque delivered by the engine is calculated which is suitable for smoothing out the jerks, such that:

$$x = \frac{1}{1 + D}$$

with $$D = \frac{\sqrt{2(1 - \cos \omega_0 t_1)}}{\omega_0 t_1}$$

and then the ignition-advance reduction, to be put into operation in order to obtain the reduced torque, is calculated.

Figures 1, 2:
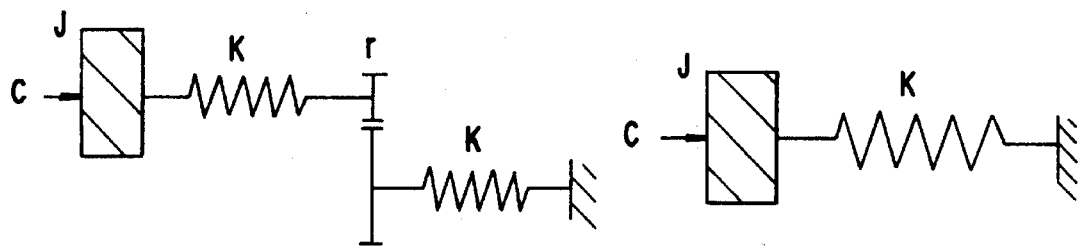
Figure 3:
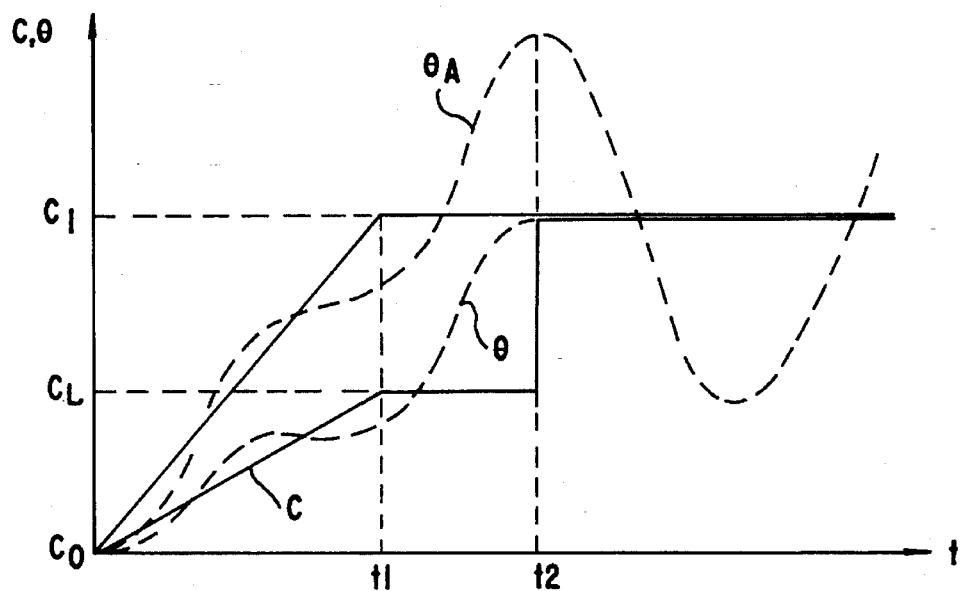
Figure 4:
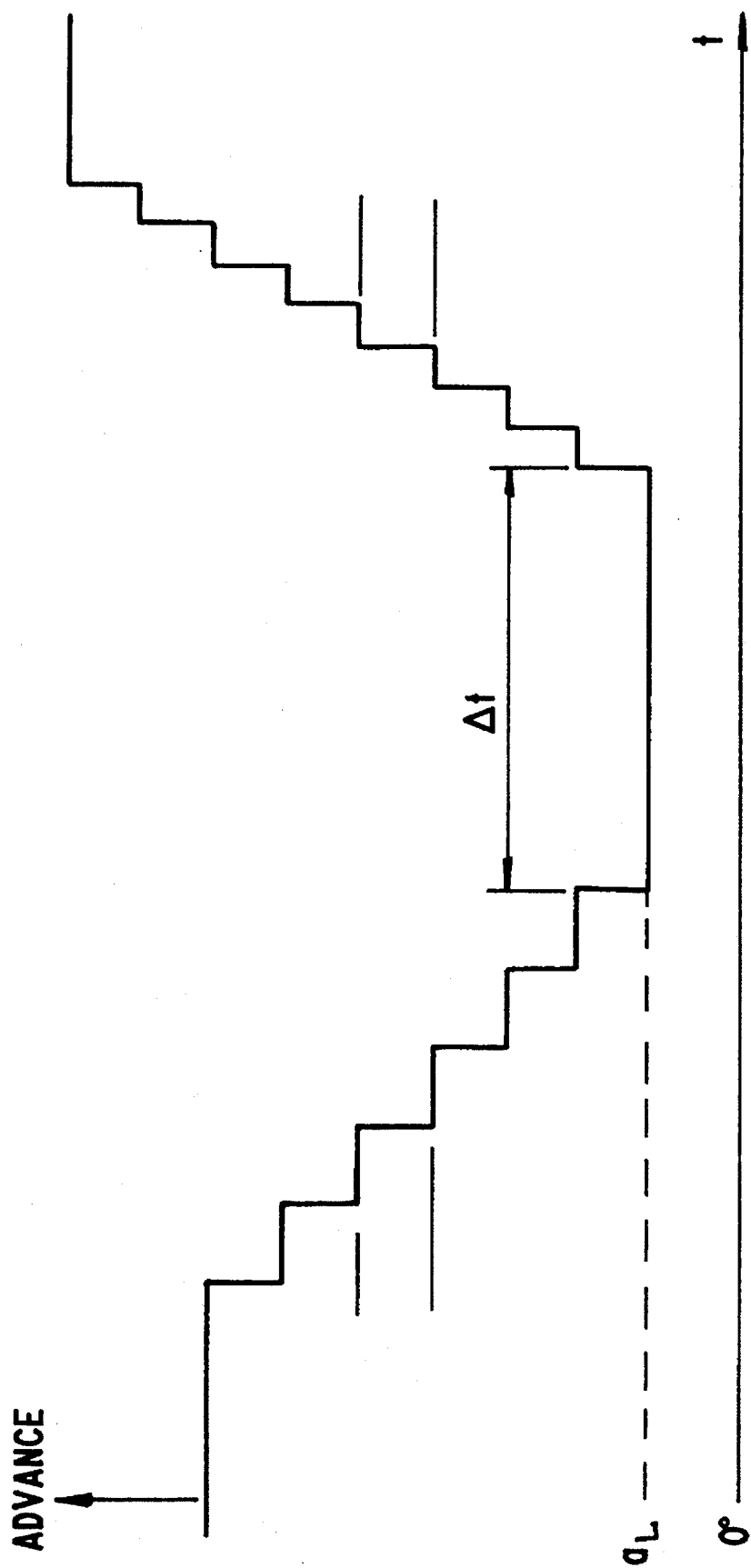

Other characteristics and advantages of the method according to the invention will emerge on reading the description which follows and on examining the attached drawing in which:

FIGS. 1 and 2 are diagrams which illustrate a modelling according to the invention of the kinematic system which goes from an internal-combustion engine to the wheels of the vehicle which it propels, FIG. 3 is a graph, useful for the explanation of the method according to the invention, of absorption of the jerks observed in an acceleration phase of the vehicle, FIG. 4 is a time diagram which illustrates the change with time of the value of the ignition-advance change with time of the value of the ignition-advance angle of the engine, established by the present invention, during an acceleration phase of the vehicle and FIGS. 5A and 5B are sets of time diagrams of the change with time of the value of the ignition advance, from the output of a longitudinal accelerometer and from the output of an opening-angle sensor of a throttle valve of the engine, which serve to illustrate the improvement in the driving comfort obtained by the present invention.

According to the invention, in order to reduce the aforementioned oscillations, reliance is placed on a prior modelling of the kinematic system in question. This modelling leads to the diagram in FIG. 1 where the engine takes the form of a mass of inertia J representing the inertia of the connecting-rod assembly and of the flywheel of the engine. The latter is conventionally associated with a clutch whose characteristics are similar to those of a spring of stiffness $K_1$. The clutch itself is associated with a gearbox whose inertia may be considered as small with respect to that of the engine and which therefore may be neglected, together with possible angular backlash. In the model in FIG. 1, the gearbox is represented by the speed-reducing gear ratio r. The members for transmitting the power to the wheels of the vehicle may be modelled by a spring of stiffness $K_2$. The kinematic system is excited by a torque C developed by the engine.

The model shown schematically in FIG. 1 may be simplified and reduced to the elements appearing in FIG. 2 where the model comprises only a mass of inertia J and a spring of stiffness K such that:

$$K = \frac{K_1 \cdot K_2}{r^2 \cdot K_1 + K_2}$$

It will be noted from now on that the equivalent stiffness K is a function of the selected gear ratio r of the gearbox.

The dynamic behaviour of the system, constituted by the mass of inertia J and the spring of stiffness K and represented in FIG. 2, is governed by the differential equation:

$$J\ddot{\theta} + K\theta = C$$

where θ is an angle which defines the angular position of the flywheel of the engine. It is the time fluctuations or oscillations in the value of this angle, which are induced by an abrupt increase in the engine torque requested by the driver, which are the cause of the jerks experienced by said driver during an acceleration phase.

According to the present invention, it is possible to cancel or at least reduce these oscillations, by controlling the engine torque during an acceleration phase as illustrated in FIG. 3. In this figure are represented the oscillations $\theta_A$ which are conventionally observed when the engine torque passes linearly from the value $C_0$ to the value $C_1$, following an action of the driver on the accelerator pedal, which controls an increase in the opening angle of a throttle valve of the engine during a time $t_1$ called hereinafter "acceleration time". Wide oscillations in $\theta_A$ are then observed which may lead to appreciable variations, of the order of 0.3 g, in the acceleration of the vehicle. It is these variations which the invention aims to reduce.

In order to do this, the torque developed by the engine is limited at will, by substituting that requested by the driver with that controlled according to the invention after a linear rise in the torque until the instant $t_1$, estimated beforehand, and the torque is stabilised at the value $C_L$ for a time $\Delta t$, this value corresponding to a predetermined fraction of the final torque $C_1$ requested by the driver, the end of the time interval $\Delta t$ coinciding with a first maximum of the oscillation in the angle $\theta_A$, reached at the instant $t_2$. The variations with time of the angle θ are then constrained as represented in FIG. 3, any oscillation even being theoretically stifled after $t_2$, which considerably improves the driving comfort.

This limitation of the torque to the value $C_L$ is obtained according to the invention by a reduction in the ignition advance of the engine. It is known that such a reduction, with respect to a value Giving the optimum torque, enables the torque supplied to be reduced. It is also known that, conventionally, this advance is measured in degrees of angle before a piston of the engine passes through its top dead centre (TDC).

According to an essential characteristic of the method according to the invention, the duration $\Delta t$ during which it is required to reduce the ignition advance in order to stabilise the torque at the value $C_L$, depends on the selected Gear ratio r in the Gearbox. According to the invention, $\Delta t$ is calculated with the aid of the following formula:

$$\Delta t = \frac{\pi - \phi}{\omega_0} - t_1$$

with $$\phi = \arccos\left( \frac{\sin \omega_0 t_1}{\sqrt{2(1 - \cos \omega_0 t_1)}} \right),$$

and $$\omega_0 = \sqrt{\frac{A}{Br^2 + C}}, \text{ characteristic frequency of the system}$$

A, B, C being constants such that:
$A = K_1 \cdot K_2$
$B = J \cdot K_1$
$C = J \cdot K_2$ It should be noted that $\Delta t$, being a function of the characteristic frequency $\omega_0$ of the system, is ultimately a function of the Gear ratio r since $\omega_0$ is a function of r.

Having thus calculated the duration $\Delta t$ of the advance reduction, it is still necessary to determine the final torque $C_1$ to be maintained for $\Delta t$. Assuming that the final torque $C_1$ is fixed, a reduction ratio (x) in this torque $C_1$ is sought such that:

$$x = \frac{1}{1 + D}$$

with $$D = \frac{\sqrt{2(1 - \cos \omega_0 t_1)}}{\omega_0 t_1},$$

D corresponding to an "overshoot rate" of the oscillations of the system.

Thus x is in fact a function of the selected gear ratio of the gearbox, being a function of $\omega_0$ which depends on r.

The method according to the invention is designed to be implemented in a system where the engine is controlled by an ignition and, optionally, injection computer. Such a computer conventionally comprises one or more microprocessors which may by duly programmed in order to execute the calculations indicated hereinabove. The implementation of the method according to the invention also requires the computer to receive the output from an accelerator-pedal position sensor and, at least, from such a sensor which is sensitive to the "foot up-foot down" transition, which is generally the case. Provision must also be made for a sensor providing the computer with the "r" information, that is to say the gear ratio engaged in the gearbox. Such sensors commonly equip gearboxes in order to provide the r information to a computer.

A potentiometric throttle-valve position sensor is also commonly used to supply a signal to an ignition- and injection-control computer. According to the invention, when the time derivative of the signal supplied by the sensor, which derivative is calculated by the computer, exceeds a predetermined threshold, the overshoot is interpreted as resulting from an abrupt acceleration requested by the driver, from a steady state for example. The advance correction according to the invention is then activated.

Reference is now made to the graph in FIG. 4 in order to describe more completely the change with time of the ignition-advance angle established on executing the method according to the invention, during an acceleration phase of the engine. Starting from an instant $t_0$ when the driver of the vehicle presses on the accelerator pedal in order to request an acceleration, the control of the ignition-advance angle by the ignition computer associated with the engine, conventionally operated as a function of the speed of this engine and of the air-induction pressure or of the inducted-air flow rate, is inhibited and replaced by the control according to the present invention. According to a preferred form of implementing this control, the advance angle is first of all uniformly decremented to a value $a_L$ corresponding to the torque reduction sought by the invention, this advance being maintained for the time interval $\Delta t$. The latter is normally close to 0 as represented in FIG. 4. At the end of the time interval $\Delta t$ which is a function, according to the invention, of the gearbox gear ratio r, the ignition-advance angle is rapidly incremented until the moment when the advance thus incremented exceeds the advance normally calculated by the ignition computer which then reassumes the control of the ignition-advance angle. The invention thus relates to the control of the ignition-advance angle during a transient acceleration phase, which control is substituted, only during such phases, by the control developed by the computer according to conventional rules. This substitution enables the acceleration jerks, which the driver would normally experience if the computer continued to operate conventionally during the acceleration phases, to be eliminated or greatly limited.

According to a preferred form of implementing the present invention, in order to avoid appreciable jerks caused by an advance reduction operated at low speed, the ignition-advance angle control according to the invention is only used, in an acceleration phase, if the speed of the engine is Greater than a predetermined speed, 700 rpm for example. A speed sensor commonly feeds information to ignition-advance computers which renders the implementation of this arrangement particularly simple.

In some computers, the ignition advance is calculated as a function of the speed of the engine and of the pressure or of the inducted-air flow rate. The locating in time of the events arising during one cycle of the engine is then produced with signals which are a function of the speed. It is then clear that the time $\Delta t$ for maintaining the reduced advance $a_L$ will be, in this case, a function not only of the Gearbox gear ratio r but also of the speed of the engine.

The ignition-advance reduction according to the invention is effective for relatively abrupt accelerations, of a duration $t_1$ of between approximately 0.1 and 0.3 s. For accelerations of longer duration, the aforementioned jerks are less appreciable and the correction is no longer necessary.

The amplitude of the oscillations to be eliminated is proportional to the increase in the opening angle of the valve during the acceleration time $t_1$. Thus, if the advance correction according to the invention is effective for an increase in a Given opening of the valve, this is also the case for a smaller valve opening even if, in this case, the torque limitation put into operation is greater than necessary.

According to the theoretical model established as indicated hereinabove, the amplitude of the oscillations diminishes when the Gearbox Gear ratio r increases, for a same acceleration time $t_1$. However, it will be noted that the advance back-off according to the invention remains necessary at high gear ratios since, the average acceleration being lower at these gear ratios, the driver experiences the acceleration oscillations to the same degree.

The advance back-off according to the invention, illustrated by FIG. 4, reveals that this back-off can vary as a function of various parameters: rate of decrease in the advance angle, value of the reduced advance $a_L$, duration $\Delta t$ of this advance, rate of rise in the advance. These parameters are influenced by a possible injection cut-off of fuel, in a deceleration phase prior to a reacceleration requested by the driver. The programming of the calculations into the microprocessor of the computer is then provided so as to take into account a possible injection cut-off, known from the computer which also controls the opening of the injectors and the injection time, within the value of these parameters.

As has been seen above, in computers where the rates of events are determined by a signal whose frequency is a function of the speed of the engine, the time $\Delta t$, for maintaining the reduced torque $a_L$, expressed as the number of times the piston of a cylinder passes through the top dead centre, will have to be corrected as a function of the speed, as well as the rates of decrease and of rise of the advance. On the other hand, since the speed has no influence on the overshoot rate D of the oscillations of the system occurring in the expression for the reduction ratio x, this amount of reduction is not influenced by the speed.

Reference will now be made to FIGS. 5A and 5B which represent the change in time of the ignition-advance angle, from the output signal of a longitudinal accelerometer and from a potentiometric sensor of the angular position of the throttle valve, in the case of an acceleration phase corrected according to the invention, or without correction, respectively. The driver requests an acceleration at the instant $t_0$. At the end of the acceleration time (stabilisation of the opening angle of the valve), damped oscillations are revealed in the output signal of the accelerometer which measures the variations in the acceleration of the vehicle over its path. It is observed that, in the absence of the advance correction according to the invention, these oscillations (see FIG. 5B), which are representative of the jerks experienced by the driver, may initially reach an amplitude of 0.3 g and are therefore very noticeable. With the advance correction according to the invention (FIG. 5A), the amplitude of the oscillations in the output of the accelerometer is very greatly reduced, by a ratio of approximately 5, and are virtually no longer noticeable to the driver.

We claim:

1. A method for smoothing out acceleration jerks of a motor vehicle propelled by an internal combustion engine and having a gearbox at an output side of the internal combustion engine, which comprises:

detecting an entry into an acceleration phase of the vehicle;

reducing an ignition advance angle of the engine to a predetermined value and maintaining the ignition advance at the predetermined value for a given time interval, wherein the given time interval is a function of a selected gear ratio of the gearbox at the output side of the engine; and selecting the given time interval $\Delta t$ from $$\Delta t = \frac{\pi - \phi}{\omega_0} - t_1$$

where:

$$\phi = \arccos\left(\frac{\sin \omega_0 t_1}{\sqrt{2(1 - \cos \omega_0 t_1)}}\right)$$

$$\omega_0 = \sqrt{\frac{A}{Br^2 + C}}$$

A, B and C are constants, and $t_1$ is a duration of an acceleration requested by a driver of the vehicle.

2. The method according to claim 1, which comprises calculating a reduction ratio x in a torque delivered by the engine which is suitable for smoothing out jerks, such that:

$$x = \frac{1}{1 + D}$$

where $$D = \frac{\sqrt{2(1 - \cos \omega_0 t_1)}}{\omega_0 t_1}$$

and subsequently calculating an ignition-advance reduction for obtaining a reduced torque.

3. The method according to claim 1, which comprises performing the detecting step with a position sensor of an accelerator pedal switching between a "foot up" position and a "foot down" position.

4. The method according to claim 3, which comprises measuring a speed of the engine and validating a detection of an entry into the acceleration phase only if the speed of the engine is greater than a predetermined threshold speed.

5. The method according to claim 1, which comprises predetermining a threshold of a time derivative of a signal representing a position of a throttle valve of the engine, and defining the entry of the engine into the acceleration phase on exceeding the threshold in the detecting step.

6. The method according to claim 5, which comprises measuring a speed of the engine and validating a detection of an entry into the acceleration phase only if the speed of the engine is greater than a predetermined threshold speed.

7. The method according to claim 1, which comprises calculating the ignition advance as a function of the speed of the engine and of one of pressure and flow rate of air inducted into the engine, and calculating the predetermined value of the reduced ignition advance as a function of the selected gear ratio of the gearbox and of the speed of the engine.

8. A method for smoothing out acceleration jerks of a motor vehicle propelled by an internal combustion engine and having a gearbox at an output side of the internal combustion engine, which comprises:

detecting an entry into an acceleration phase of the vehicle;

reducing an ignition advance angle of the engine to a predetermined value by uniformly decrementing the ignition advance prior to the entry into the acceleration phase with advance calculating and controlling means associated with the engine, and maintaining the ignition advance at the predetermined value for a given time interval, wherein the given time interval is a function of a selected gear ratio of the gearbox at the output side of the engine; and inhibiting the controlling means on detecting an entry into the acceleration phase.

9. The method according to claim 8, which comprises reactivating the calculating and controlling means at the end of the acceleration phase, and uniformly incrementing the ignition advance at the end of the time interval $\Delta t$ up to a level corresponding to an advance calculated by the calculating and controlling means.

10. The method according to claim 9, which comprises detecting a cut-off of fuel supply to a device for injecting fuel into the engine: prior to the entry into the acceleration phase, and correcting a rate of decrementing the ignition advance, a rate of incrementing the ignition advance, and the predetermined value maintained during the time interval $\Delta t$, as a function of a cut-off detection.

\* \* \* \* \*